United States Patent
Lee et al.

(10) Patent No.: US 10,215,433 B2
(45) Date of Patent: Feb. 26, 2019

(54) HUMIDIFICATION AND AIR CLEANING APPARATUS

(71) Applicant: LG ELECTRONICS INC., Seoul (KR)

(72) Inventors: Kunyoung Lee, Seoul (KR); Hyungho Park, Seoul (KR); Taeyoon Kim, Seoul (KR); Jongsu Lee, Seoul (KR); Jieun Choi, Seoul (KR); Sanghyuk Son, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 15/338,270

(22) Filed: Oct. 28, 2016

(65) Prior Publication Data

US 2017/0122601 A1 May 4, 2017

Related U.S. Application Data

(60) Provisional application No. 62/355,118, filed on Jun. 27, 2016, provisional application No. 62/248,463, filed on Oct. 30, 2015.

(30) Foreign Application Priority Data

Nov. 7, 2015 (KR) .................. 10-2015-0156254
Dec. 24, 2015 (KR) .................. 10-2015-0185856
(Continued)

(51) Int. Cl.
*F24F 3/14* (2006.01)
*B01D 50/00* (2006.01)
(Continued)

(52) U.S. Cl.
CPC .............. *F24F 11/30* (2018.01); *B01D 46/10* (2013.01); *B01D 46/4254* (2013.01);
(Continued)

(58) Field of Classification Search
CPC .............. B01D 50/00; F24F 3/14; B01F 3/04
(Continued)

(56) References Cited

U.S. PATENT DOCUMENTS

| | | |
|---|---|---|
| 5,213,595 A | 5/1993 | Kim |
| 7,993,589 B1 | 8/2011 | Shigemoto et al. |

(Continued)

FOREIGN PATENT DOCUMENTS

| | | |
|---|---|---|
| EP | 1 637 811 A1 | 3/2006 |
| JP | 2014-35144 A | 2/2014 |

(Continued)

OTHER PUBLICATIONS

NAVER Blog: Aroma Diffuser & Humidifier, Oct. 28, 2015.

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes an air clean module receiving external air and performing filtration on the entered external air to generate filtered air, an air wash module disposed at an upper part of the air clean module, receiving filtered air from the air clean module, and performing humidification on the filtered air, a dust sensor disposed on at least one of the air clean module or the air wash module and detecting a dust concentration of external air, and a lighting module disposed on at least one of the air clean module or the air wash module and emitting light as a color classified according to a dust concentration detected from the dust sensor.

14 Claims, 18 Drawing Sheets

(30) Foreign Application Priority Data

Mar. 28, 2016 (KR) ........................ 10-2016-0037235
Oct. 6, 2016 (KR) ........................ 10-2016-0129324

(51) Int. Cl.

| | | |
|---|---|---|
| *B01F 3/04* | (2006.01) | |
| *F24F 11/30* | (2018.01) | |
| *F24F 6/16* | (2006.01) | |
| *B01D 46/10* | (2006.01) | |
| *B01D 46/42* | (2006.01) | |
| *B01D 46/44* | (2006.01) | |
| *F24F 6/04* | (2006.01) | |
| *F24F 13/20* | (2006.01) | |
| *F24F 13/28* | (2006.01) | |
| *F24F 11/52* | (2018.01) | |
| *F24F 110/50* | (2018.01) | |
| *F24F 110/64* | (2018.01) | |
| *F24F 6/00* | (2006.01) | |

(52) U.S. Cl.
CPC ........... *B01D 46/442* (2013.01); *B01D 50/00* (2013.01); *B01F 3/04* (2013.01); *F24F 3/14* (2013.01); *F24F 6/04* (2013.01); *F24F 6/16* (2013.01); *F24F 13/20* (2013.01); *F24F 13/28* (2013.01); *B01D 2279/50* (2013.01); *F24F 11/52* (2018.01); *F24F 2006/008* (2013.01); *F24F 2006/046* (2013.01); *F24F 2110/50* (2018.01); *F24F 2110/64* (2018.01); *Y02A 50/25* (2018.01)

(58) Field of Classification Search
USPC .................. 96/417, 418; 261/30; 55/318
See application file for complete search history.

(56) References Cited

U.S. PATENT DOCUMENTS 7,998,419 B2 * 8/2011 Furuhashi ................ A61L 9/22
422/123
2015/0273378 A1 10/2015 Sohn et al.

FOREIGN PATENT DOCUMENTS

| | | |
|---|---|---|
| JP | 2015-143603 A | 8/2015 |
| KR | 10-2009-0088711 A | 8/2009 |
| KR | 10-2011-0076049 A | 7/2011 |
| KR | 10-2013-0129062 A | 11/2013 |
| KR | 10-2014-0092953 A | 7/2014 |
| KR | 10-1515153 B1 | 4/2015 |

* cited by examiner

163

HUMIDIFICATION AND AIR CLEANING APPARATUS

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, Korean Patent Application No. 10-2015-0156254, filed on Nov. 7, 2015, Korean Patent Application No. 10-2015-0185856, filed on Dec. 24, 2015, Korean Patent Application No. 10-2016-0037235, filed on Mar. 28, 2016, U.S. Provisional Application No. 62/355,118, filed on Jun. 27, 2016 and Korean Patent Application No. 10-2016-0129324, filed on Oct. 6, 2016, the entire contents of which are hereby incorporated by reference.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges atomized water into air and a natural evaporation type that naturally evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter. However, since the main function of a typical humidifier is a humidification function, its air cleaning function is weak.

Also, since a typical humidifier has a structure in which the humidification process is performed by adding a filtration function, a typical humidifier cannot be operated only for air filtration.

Accordingly, even in a situation where humidity is high, a typical humidifier inevitably performs humidification even thought a user desires air cleaning.

SUMMARY OF THE INVENTION

The present invention provides a humidification and air cleaning apparatus for allowing users to intuitively recognize the cleanness of indoor air.

The present invention also provides a humidification and air cleaning apparatus for displaying the cleanness of indoor air through the color of light emitted.

The present invention also provides a humidification and air cleaning apparatus for checking the cleanness of indoor air at a long distance where a letter or a number is unidentifiable.

The present invention also provides a humidification and air cleaning apparatus for checking the cleanness of indoor air in all directions.

The objectives of the present invention are not limited to the above-mentioned objectives, and other objectives that are not mentioned will be clearly understood by persons skilled in the art from the following description.

Embodiments of the present invention provide humidification and air cleaning apparatuses including: an air clean module receiving external air and performing filtration on the entered external air to generate filtered air; an air wash module disposed at an upper part of the air clean module, receiving filtered air from the air clean module, and performing humidification on the filtered air; a dust sensor disposed on at least one of the air clean module or the air wash module and detecting a dust concentration of external air; and a lighting module disposed on at least one of the air clean module or the air wash module and emitting light as a color classified according to a dust concentration detected from the dust sensor.

In some embodiments, the lighting module may be disposed along an outer side surface of the air clean module or the air wash module and emit light in all directions of the air clean module and the air wash module.

In some embodiments, the lighting module may include: a printed circuit board; a first light emitting member disposed at one side surface of the printed circuit board and a second light emitting member disposed at the other side surface of the printed circuit board; and a diffusion member having one end facing the first light emitting member and the other end facing the second light emitting member.

In some embodiments, when seen from a plane, the diffusion member may be formed in a ring shape.

In some embodiments, a portion of the diffusion member may be cut off to form a separation part and the first light emitting member and the second light emitting member may be disposed at the separation part.

In some embodiments, the first light emitting member may face the one end of the diffusion member forming the separation part and allow light emitted to the inside of the diffusion member to be incident through the facing one end.

In some embodiments, the second light emitting member may face the other end of the diffusion member forming the separation part and allow light emitted to the inside of the diffusion member to be incident through the facing other end.

In some embodiments, the printed circuit board may be disposed vertically and the first light emitting member and the second light emitting member may be disposed horizontally.

In some embodiments, the first light emitting member and the second light emitting member may be disposed in an opposite direction.

In some embodiments, the diffusion member may further include a bracket fixed to a structure of the air clean module and a structure of the air wash module.

In some embodiments, the air wash module may further include a visual body formed of a transparent material and an installation part formed at the visual body and including the lighting module installed, wherein light emitted from the lighting module may be diffused to the outside through the visual body.

In some embodiments, the installation part may include: a diffusion member installation part wherein the diffusion member is disposed; and an electronic component installation part where the first light emitting member, the second light emitting member, and the printed circuit board are installed.

In some embodiments, the diffusion member installation part may protrude to the inside of the visual body and the diffusion member may be disposed at an upper side of the diffusion member installation part.

In some embodiments, the electronic component installation part may protrude to the inside of the visual body and the printed circuit board, the first light emitting member, and the second light emitting member may be disposed at an upper side of the electronic component installation part.

In some embodiments, the humidification and air cleaning apparatuses may further include a drainage part disposed on at least one of the diffusion member installation part or the electronic component installation part and draining water downwardly.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
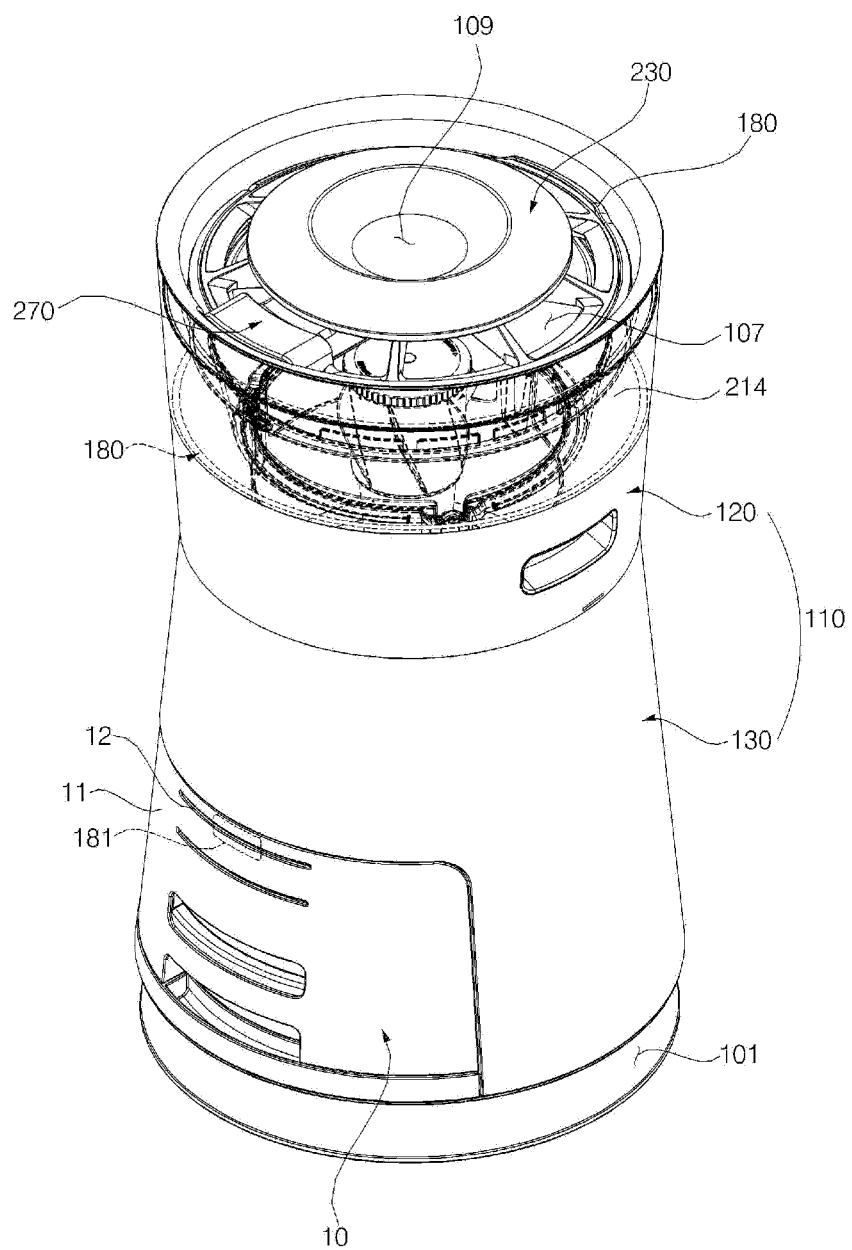
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
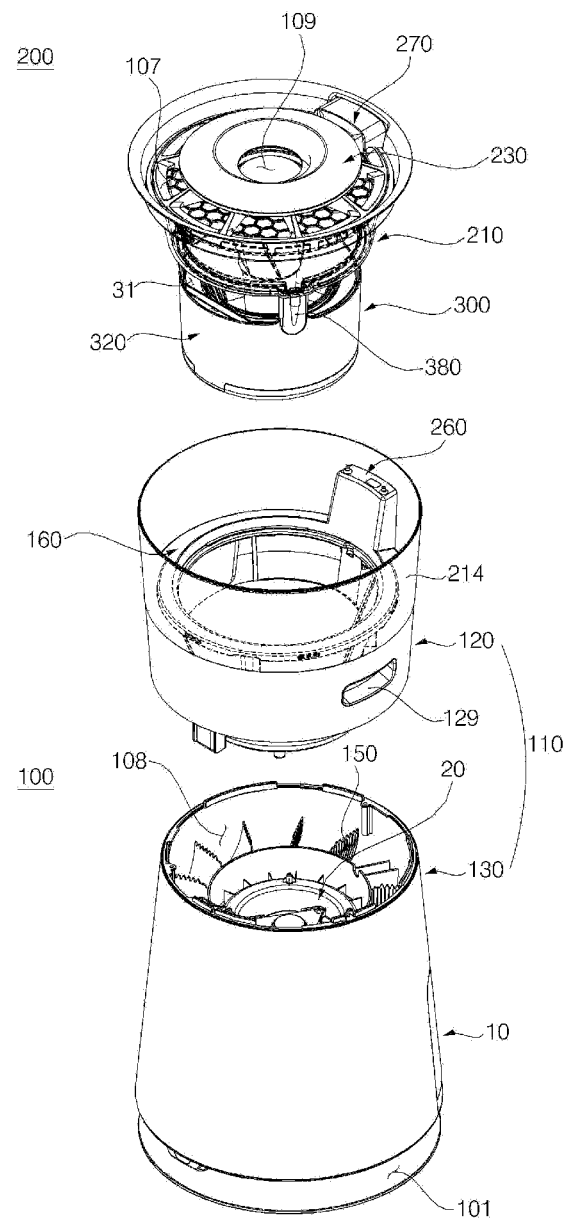
FIG. 2 is an exploded perspective view of FIG. 1.
Figure 3:
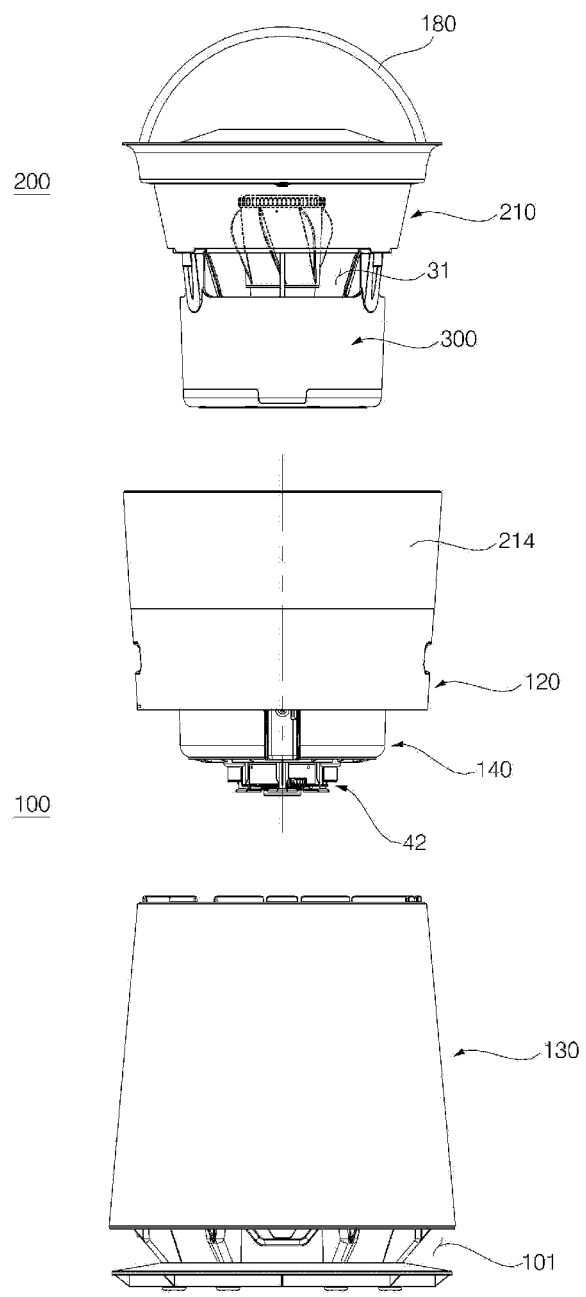
FIG. 3 is an exploded front view of FIG. 1.
Figure 4:
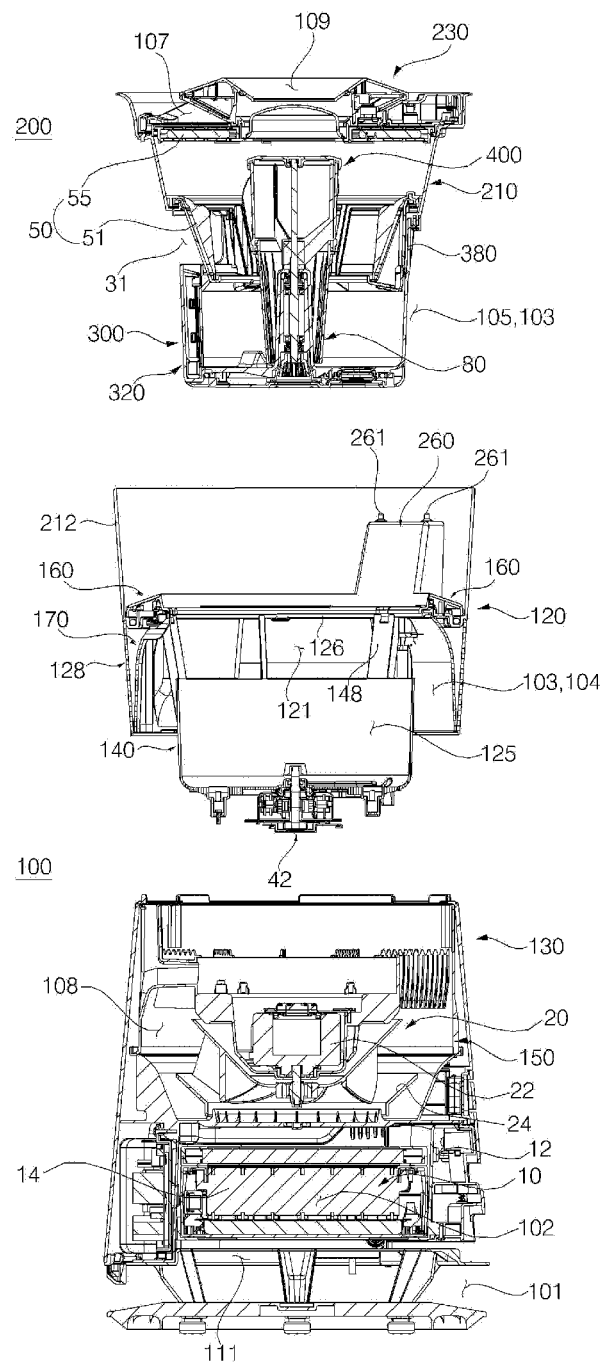
FIG. 4 is an exploded cross-sectional view of FIG. 3.
Figure 5:
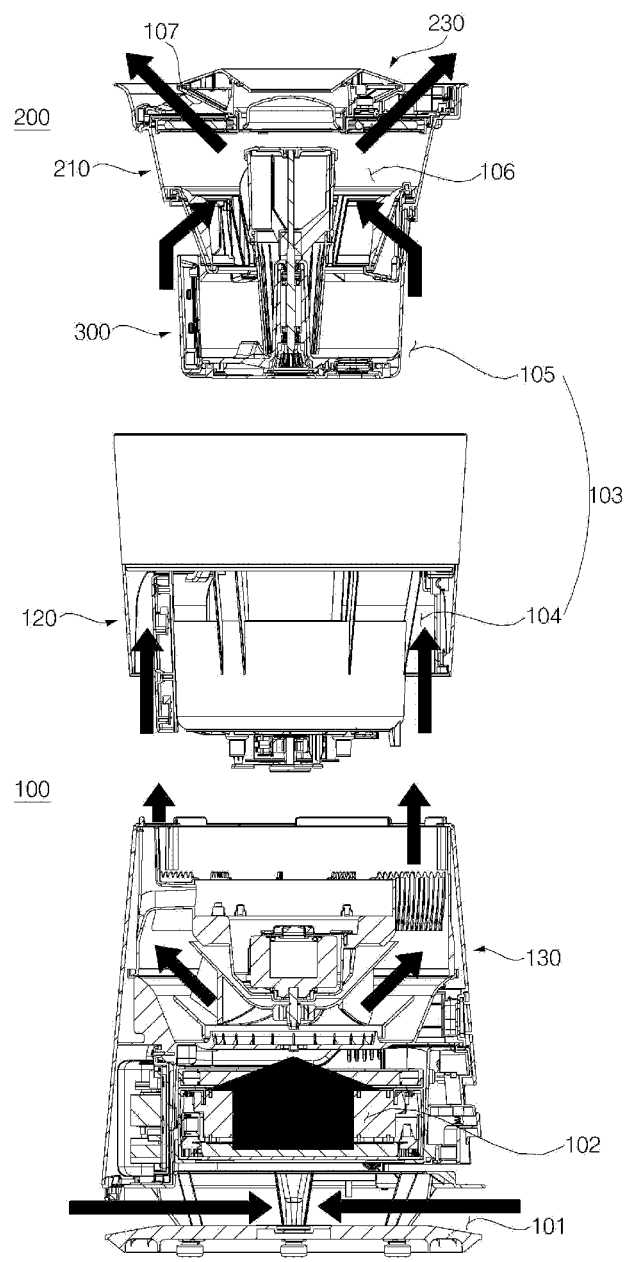
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a view illustrating an air flow of the humidification and air cleaning apparatus according to the first embodiment of the present invention.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user. The air clean module 100 may be cleaned after a filter assembly 10 described later is separated.

A user may supply water into the air wash module 200. The air wash module 200 may have a water supply flow passage formed therein to supply water from the outside to the water tank 300.

The water supply flow passage may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly formed at the air clean module 100 and the air wash module 200.

The connection flow passage formed in the air clean module 100 may be defined as a clean connection flow passage 104, and the connection flow passage formed in the air wash module 200 may be defined as a humidification connection flow passage 105. When the air wash module 200 is placed on the air clean module 100, the connection flow passage is connected, and the flow passage of air may be accurately configured.

The flow of air passing through the air clean module 100 and the air wash module 200 will be described in more detail later.

Hereinafter, a configuration of the air clean module 100 will be described in more detail.

The air clean module 100 may include a base body 110 having an intake flow passage 101 and a clean connection flow passage 104 formed therein, a filter assembly 10 that is separably disposed in the base body 110 and filters flowing air, and an air blowing unit 20 that is disposed inside the base body 110 and allows air to flow.

External air may be entered into the base body through the intake flow passage 101. Filtered air in the filter assembly 10 may be provided to the air wash module 200 through the clean connection flow passage 104.

In this embodiment, the base body 110 may be configured to have two parts.

The base body 110 may include the lower body 130 defining the exterior thereof and having an inlet hole 110 formed in the undersurface thereof, and the upper body 120 defining the exterior thereof and coupled to the upper side of the lower body 130.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The upper body 120 and the lower body 130 may be assembled into one body. Unlike this embodiment, the upper body 120 and the lower body 130 may be integrally manufactured.

The air wash module 200 may be separably placed on the upper body 120, and the load of the air wash module 200 may be supported by the upper body 120.

The upper body 120 may provide a structure where the water tank 300 is mounted stably. The upper body 120 may have a structure where the water tank 300 of the air wash module 200 is separable. The upper body 120 may have a concave structure for receiving the water tank 300.

The upper body 120 may be convavely formed inside the base body 110 and the water tank 300 may be received inside the base body 110. Through this, the center of gravity of an air cleaner may be further moved to the lower side.

The humidification and air cleaning apparatus according to this embodiment may be supplied with power through the air clean module 100, and may provide power to the air wash module 200 through the air clean module 100. Since the air wash module 200 has a structure separable from the air clean module 100, the air clean module 100 and the air wash module 200 may be provided with a separable power supply structure.

Since the air clean module 100 and the air wash module 200 are assembled through the upper body 120, a base connector 260 may be disposed in the upper body 120 to provide power for the air wash module 200. A top connector 270 may be disposed in the top cover assembly 230, and may be separably connected to the base connector 260. When the top cover assembly 230 is placed, the top connector 270 may be disposed over the base connector 260. The top cover assembly 230 may be supplied with electricity from the base connector 260 via the top connector 270.

The filter assembly 10 may be detachably assembled with the base body 110.

The filter assembly 10 may provide the filtering flow passage 102, and may filter external air.

The filter assembly 10 may have a structure that is detachable from the base body 110 in a horizontal direction. The filter assembly 10 may be disposed so as to cross the flowing direction of air that flows upstream in a vertical direction. The filter assembly 10 may be disposed in a horizontal direction that orthogonally crosses the direction of air flowing from a lower side to an upper side.

The filter assembly 10 may slide in a horizontal direction with respect to the base body 110.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower fan 24 may be a centrifugal fan, and may blow air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may not be located on the airflow passage by the blower fan 24.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The water tank 300 may be mounted on the upper body 120. The watering unit 400 may be disposed inside the water tank 300, and may rotate inside the water tank 300.

The watering unit 400 may draw water inside the water tank 300, upwardly pump the drawn water, and then spray the pumped water toward the outside in a radial direction. The watering unit 400 may include the watering housing 800 that draws water, upwardly pumps drawn water, and then sprays pumped water toward the outside in a radiation direction.

Water sprayed from the watering housing 800 may wet the humidification medium 50. Water sprayed from the watering housing 800 may be sprayed toward at least one of the visual body 210 and the humidification medium 50.

In this embodiment, the watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

The visual body 210 may be coupled to the water tank 300, and may be located over the water tank 300. At least a portion of visual body 210 may be formed of a material through which a user can see the inside.

Droplets formed on the inner side surface of the visual body 210 may implement a form of raindrops. Droplets flowing down from the visual body 210 may wet the humidification medium. 50.

A display module 160 may be disposed outside the visual body 210. The display module 160 may be coupled to any one of the visual body 210 and the upper body 120. In this embodiment, the display module 160 may be disposed at the upper body 120.

When the air wash module 200 is placed, the outer surface of the visual body 210 may adhere closely to the display module 160. At least a portion of the surface of the display module 160 may be formed of a material that reflects light.

Droplets formed on the visual body 210 may also be projected onto the surface of the display module 160. Accordingly, a user can observe the motion of droplets at both visual body 210 and display module 160.

The water tank 300 may include a water tank inlet 31 through which air passes. The air supplied from the air clean module 100 may flow into the air wash module 200 through the water tank inlet 31.

The humidification medium 50 may include a water tank humidification medium 51 disposed at the connection flow passage 103, and a discharge humidification medium 55 disposed at the discharge flow passage 107.

The water tank humidification medium 51 may be disposed on the connection flow passage 103 and in this embodiment, may be disposed at the water tank inlet 31 of the water tank 300. The water tank humidification medium 51 may be disposed inside the water tank inlet 31 and provide humidification on air passing through the water tank inlet 31.

The water tank humidification medium 51 may cover the water tank inlet 31, and air may penetrate the water tank humidification medium 51 to flow into the water tank 300.

The discharge humidification medium 55 may be disposed on the discharge flow passage 107. The discharge humidification medium 55 may be disposed on at least one of the visual body 21 or the top cover assembly 230. In this embodiment, the discharge humidification medium 55 may be disposed at the top cover assembly 230.

The discharge humidification medium 55 may cover the discharge flow passage 107, and air may penetrate the discharge humidification medium 55 to flow to the outside of the top cover assembly 230.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may pass the air clean module 100 and the air wash module 200 while moving upward, and may be discharged to the outside through the discharge flow passage 107 formed at an upper side of the air wash module 200.

The air entered to the intake flow passage 101 may pass through the filtering flow passage 102 of the filter assembly 10. As the air passes through the filtering flow passage 102, the filter assembly 10 may filter external air.

Air passing the filtering flow passage 102 may flow to the connection flow passage through the air blowing unit 20. After the air passing through the filtering flow passage 102 is pressed by the blower fan 24, it flows to the connection flow passage 103 along the blower fan housing 150.

Since the air blowing unit 20 is disposed next to the filtering flow passage 102, adherence of foreign substances like dust on the blower fan 24 can be minimized.

If the air blowing unit 20 is disposed before the filtering flow passage 102, foreign substances may be attached to the blower fan 24, and due to this, a cleaning cycle may be shortened.

Also, since the air blowing unit 20 is disposed at the front of the humidification flow passage 106, adherence of moisture on the surface of the blower fan 24 can be minimized. When moisture adheres to the surface of the blower fan 24, foreign substances may adhere to the surface of the blower fan 24 or molds may be likely to grow on the blower fan 24.

Since the air blowing unit 20 is disposed between the filtering flow passage 102 and the humidification flow passage 106, the adherence of foreign substances may be minimized and the flow pressure of air may be provided appropriately.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, when the connection flow passage 103 is distributed as a partial structure of the upper body 120 and a partial structure of the water tank 300 and the air wash module 200 is mounted on the upper body 120, the connection flow passage 103 may be formed.

In this embodiment, the upper body 120 may provide the outer structure of the connection flow passage 103 and the water tank 300 may provide the inner structure of the connection flow passage 103.

That is, the connection flow passage 103 may be formed between the outside of the water tank 300 and the inside of the upper body 120. Therefore, the connection flow passage 103 may be formed between the water tank 300 and the upper body 120. The water tank 300 may form an inner wall of the connection flow passage 103 and the upper body 120 may form an outer wall of the connection flow passage 103.

In such a manner, the structure of the connection flow passage 103 may minimize a structure for forming a flow passage through a distributed arrangement. The connection flow passage 103 may be formed in a vertical direction.

Air passing through the connection flow passage 103 may flow into the humidification flow passage 106. The humidification flow passage 106 may be a section where moisture is supplied. In this embodiment, the humidification flow passage 106 may be a flow passage from the water tank humidification medium 51 to the discharge humidification medium 55.

While air passes through the water tank humidification medium 51, moisture may be supplied to the air in the connection flow passage 51. Then, water drops scattered from the watering unit 400 and moistures evaporated from the water tank 300 may be provided into the water tank 300.

As air passes through the discharge humidification medium 55, moisture may be supplied again to the air in the water tank 300.

Moisture may be supplied in the humidification flow passage 106 through the water tank humidification medium 51, the inside of the water tank 300, and the discharge humidification medium 55.

Air passing through the discharge humidification medium 55 may be exposed to the outside through the discharge flow passage 107.

Figure 6:
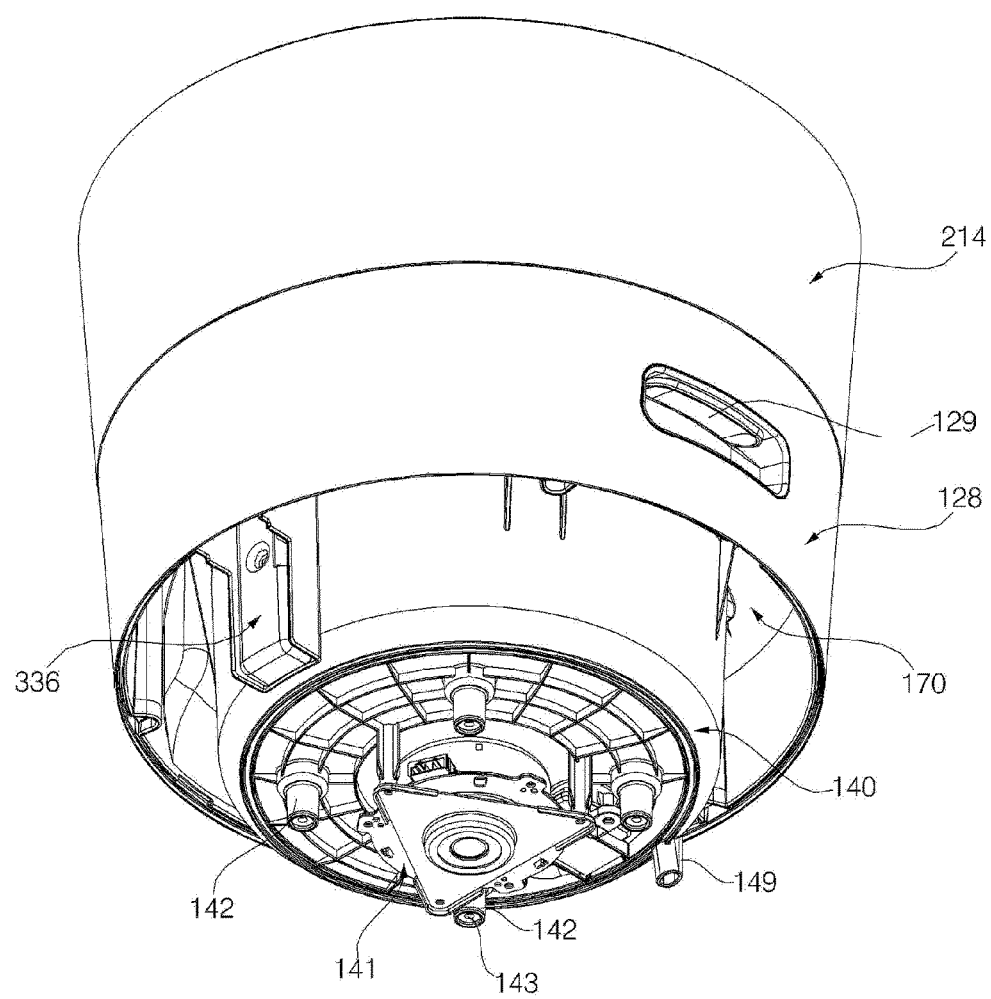
FIG. 6 is a perspective view of an upper body lower side of FIG. 2.
Figure 7:
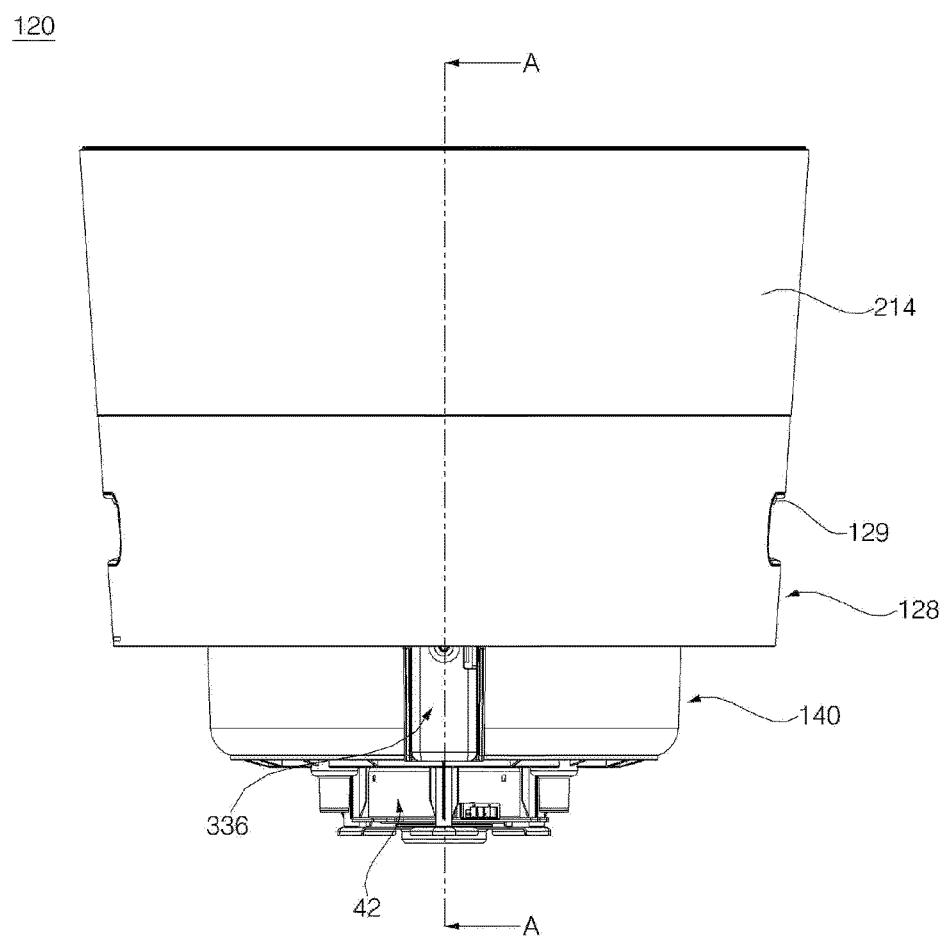
FIG. 7 is a front view of FIG. 6.
Figure 8:
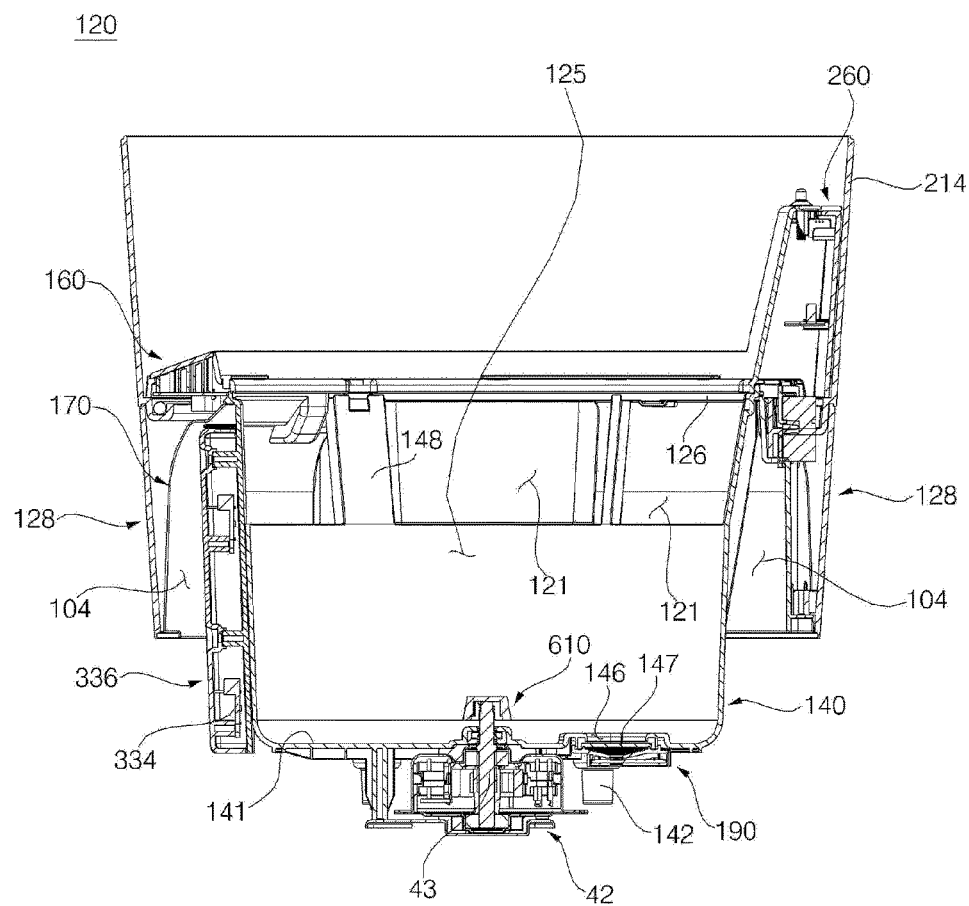
FIG. 8 is a cross-sectional view taken along line A-A of FIG. 7.
Figure 9:
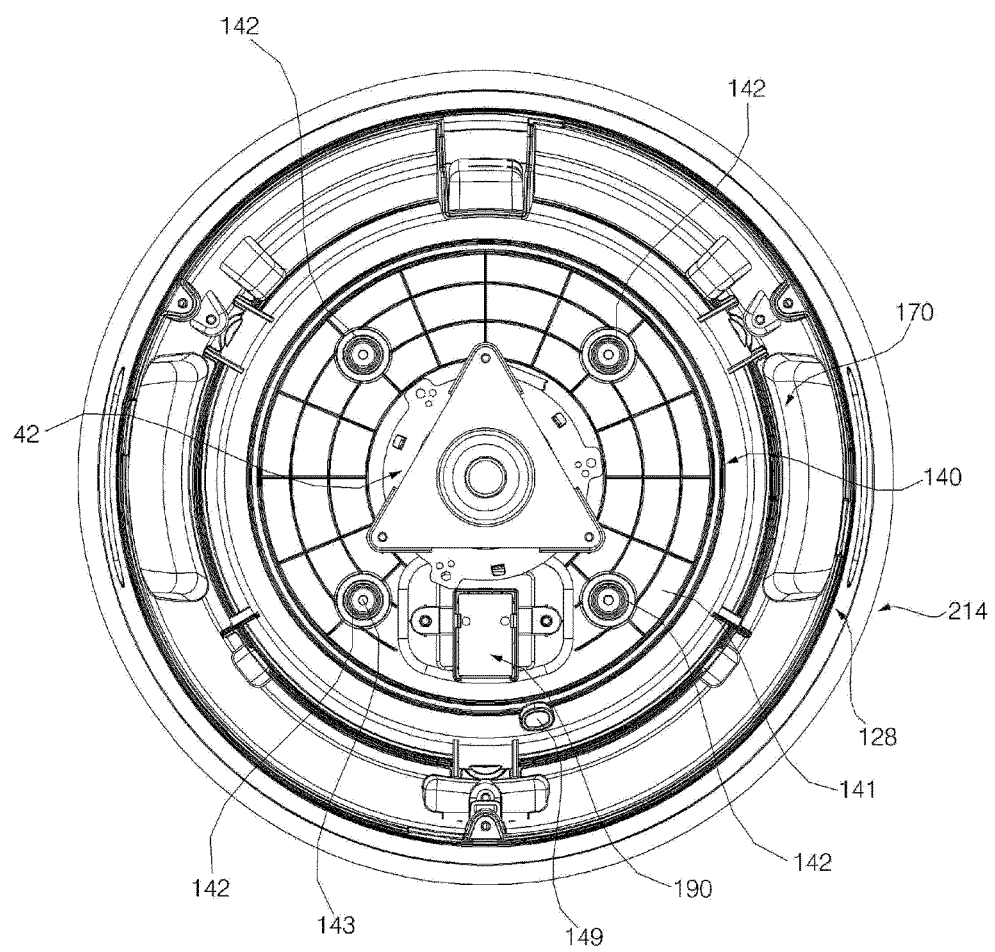
FIG. 9 is a bottom view of FIG. 6.
Figure 10:
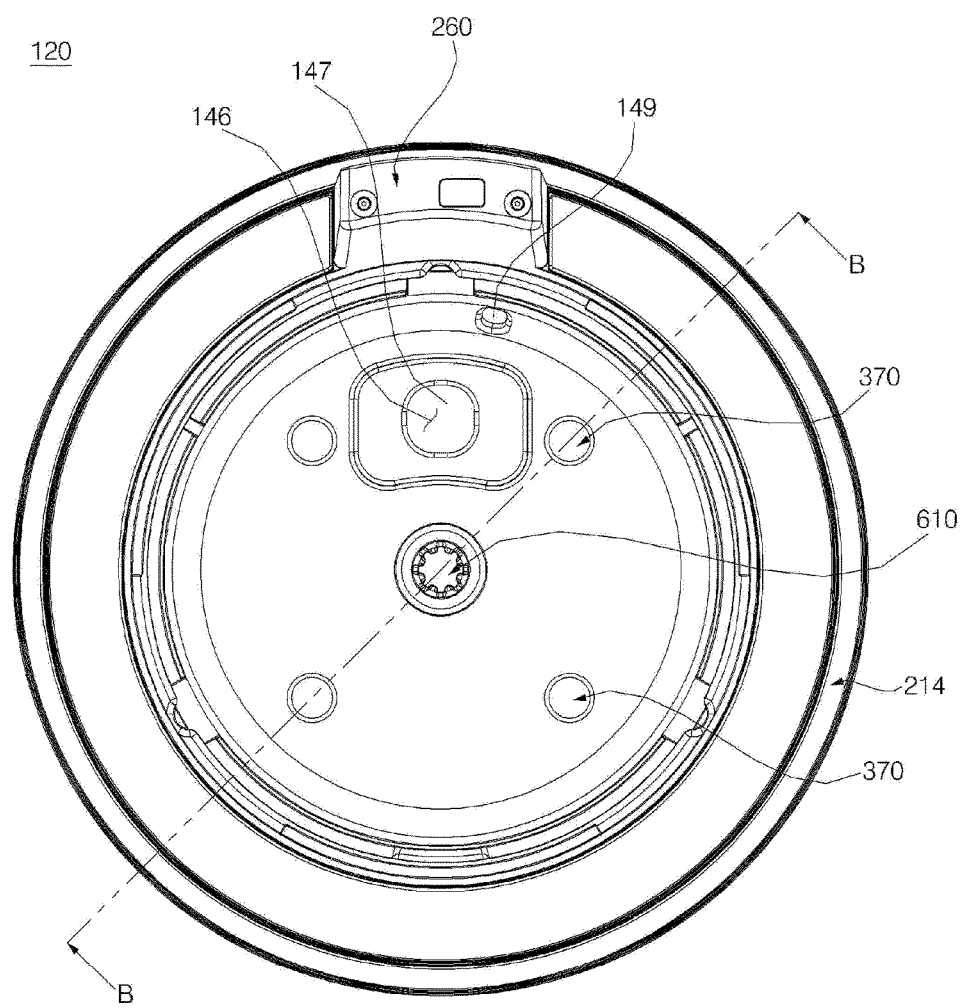
FIG. 10 is a plan view of FIG. 6.
Figure 11:
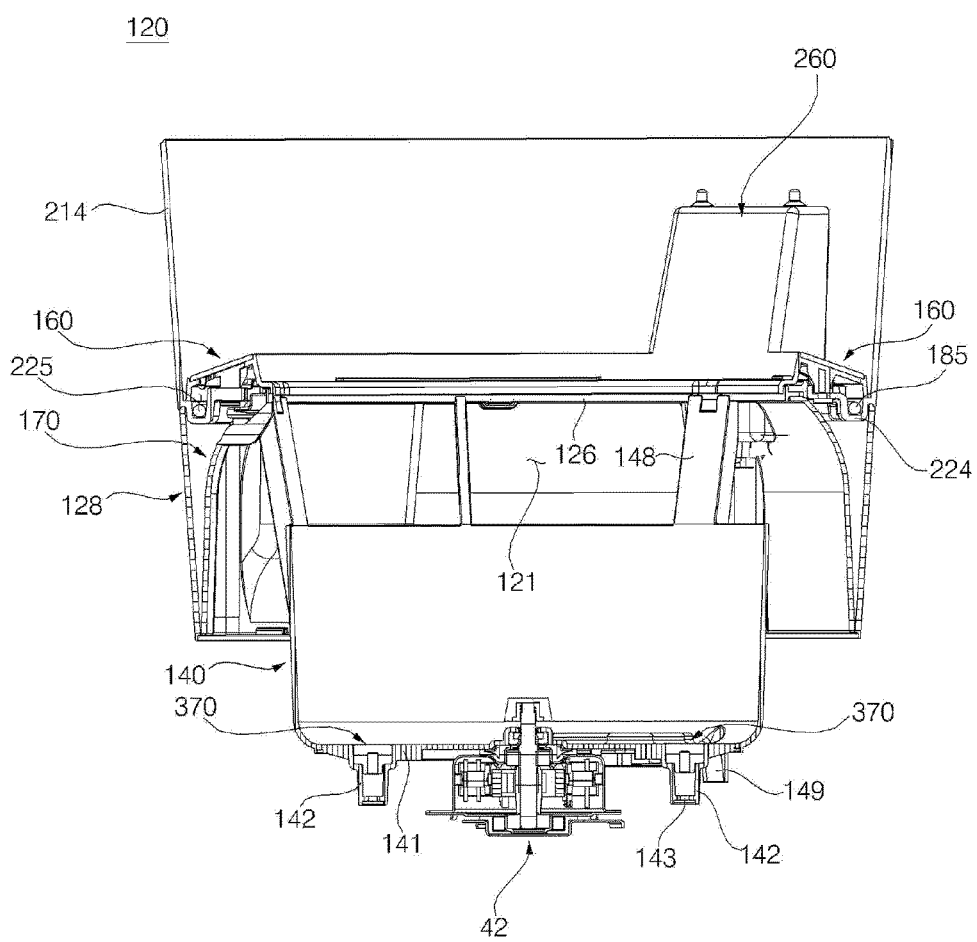
FIG. 11 is a cross-sectional view taken along a line B-B of FIG. 10.
Figure 12:
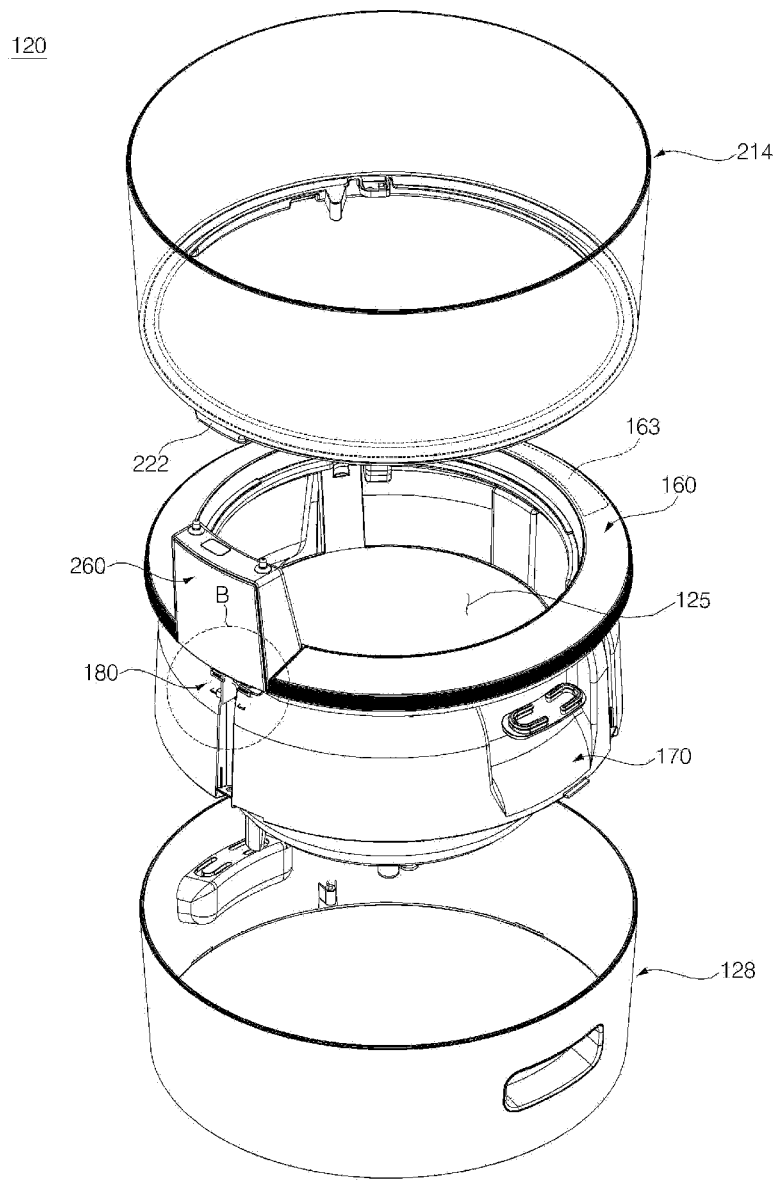
FIG. 12 is an exploded perspective view of an upper body when seen from the rear side of FIG. 6.
Figure 13:
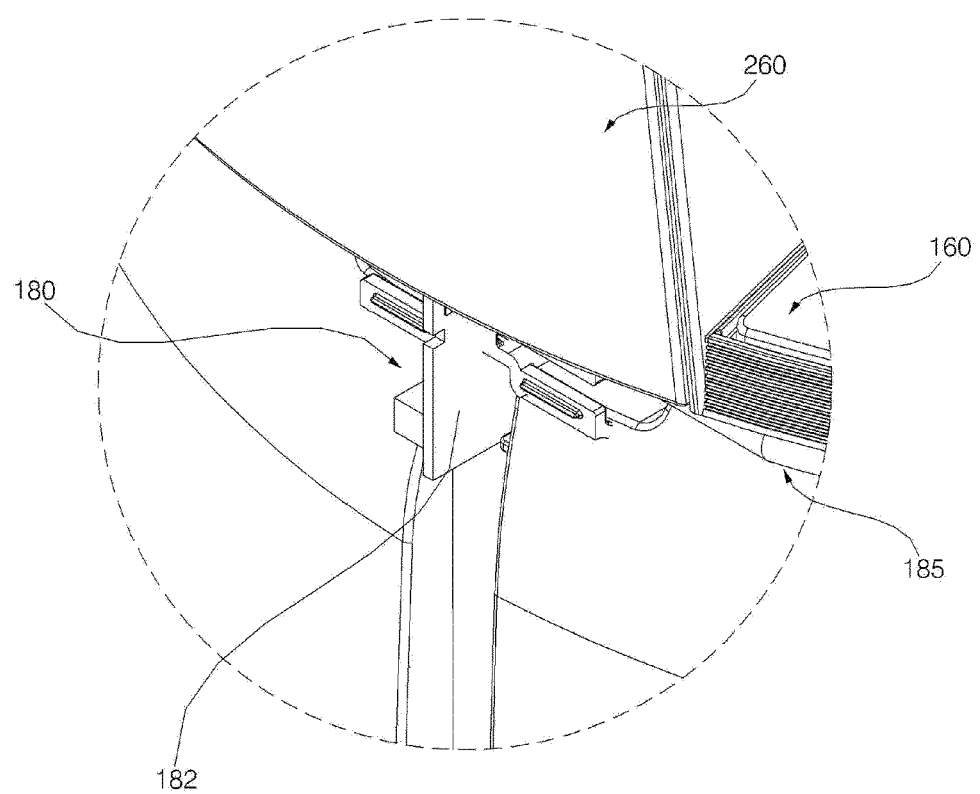
FIG. 13 is an enlarged view of B shown in FIG. 12.
Figure 14:
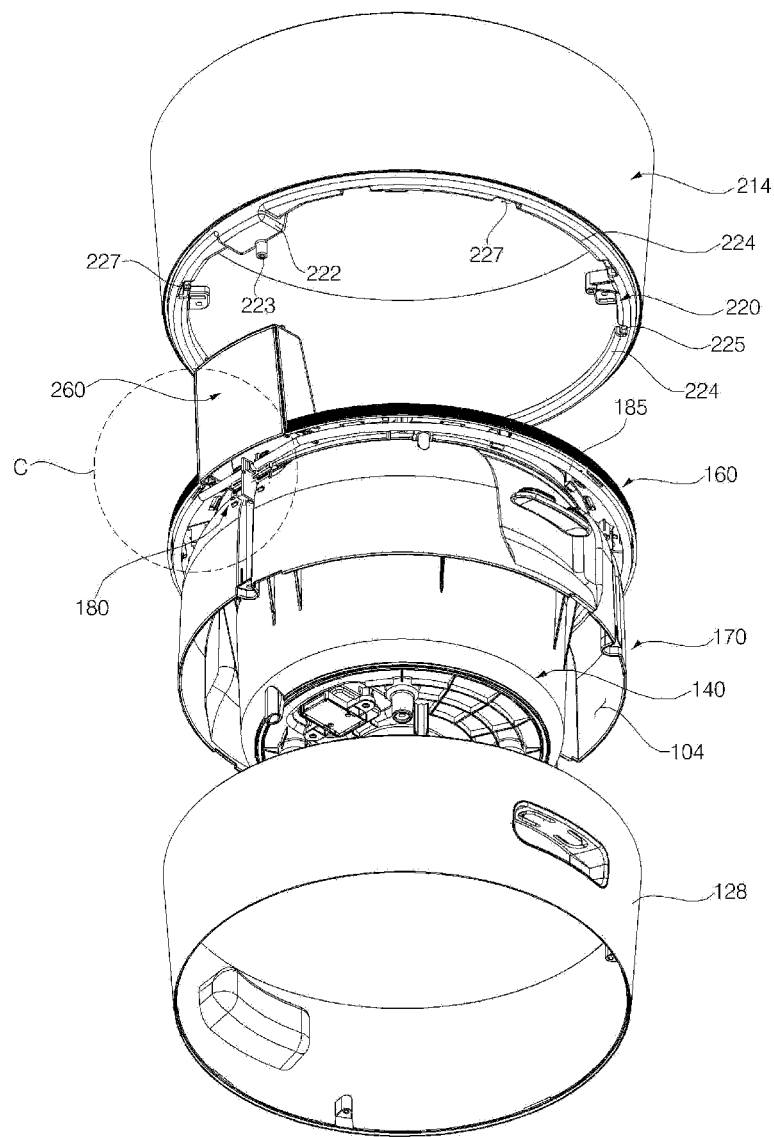
FIG. 14 is an exploded perspective view when seen from the bottom of FIG. 12.
Figure 15:
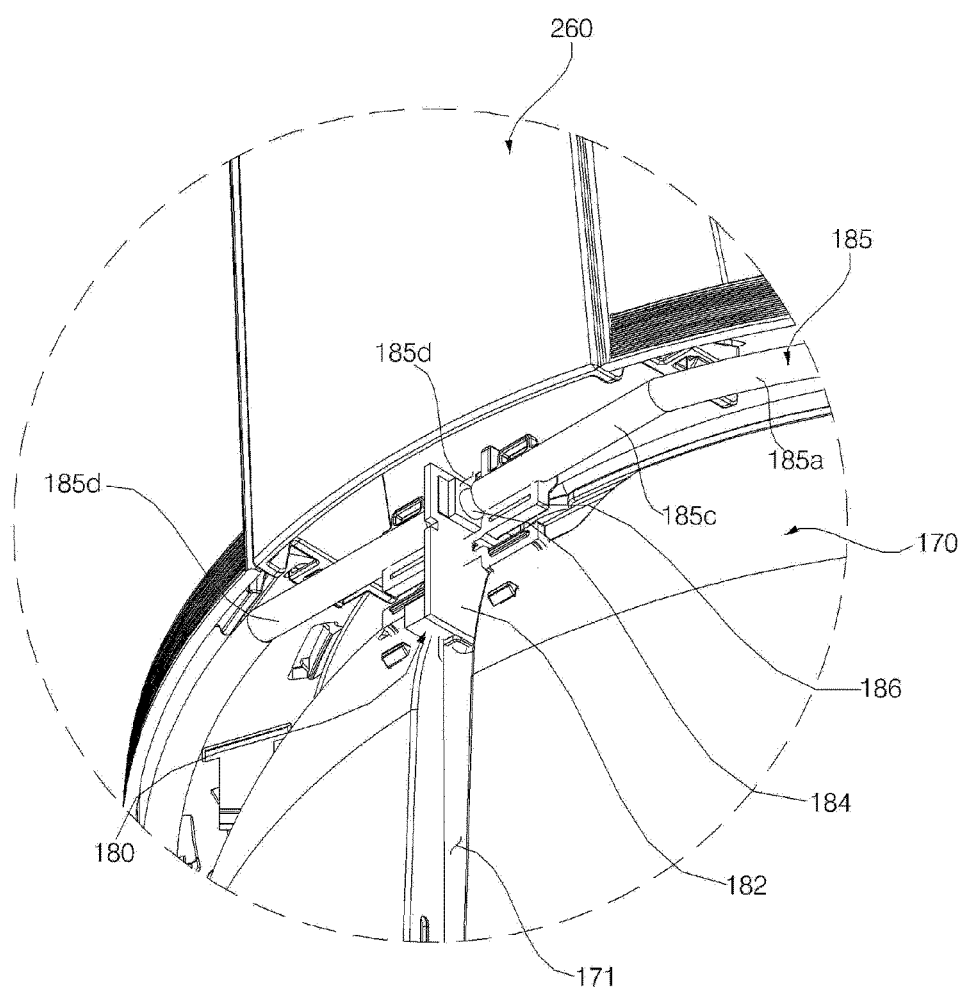
FIG. 15 is an enlarged view of C shown in FIG. 14.
Figure 16:
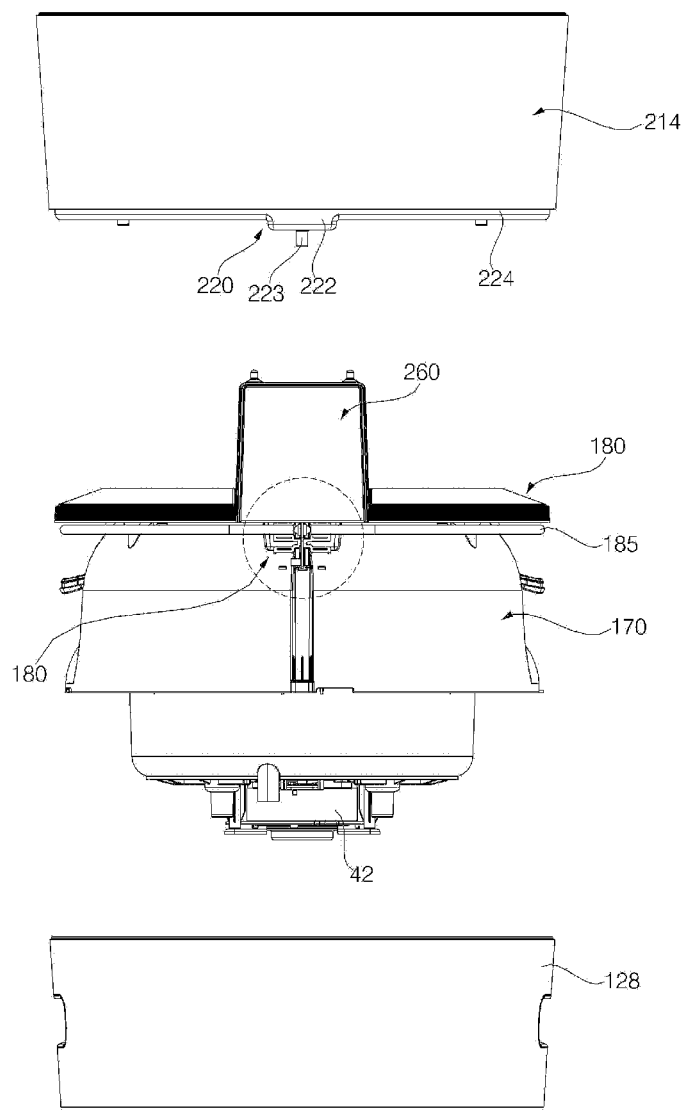
FIG. 16 is a front view of FIG. 12.
Figure 17:
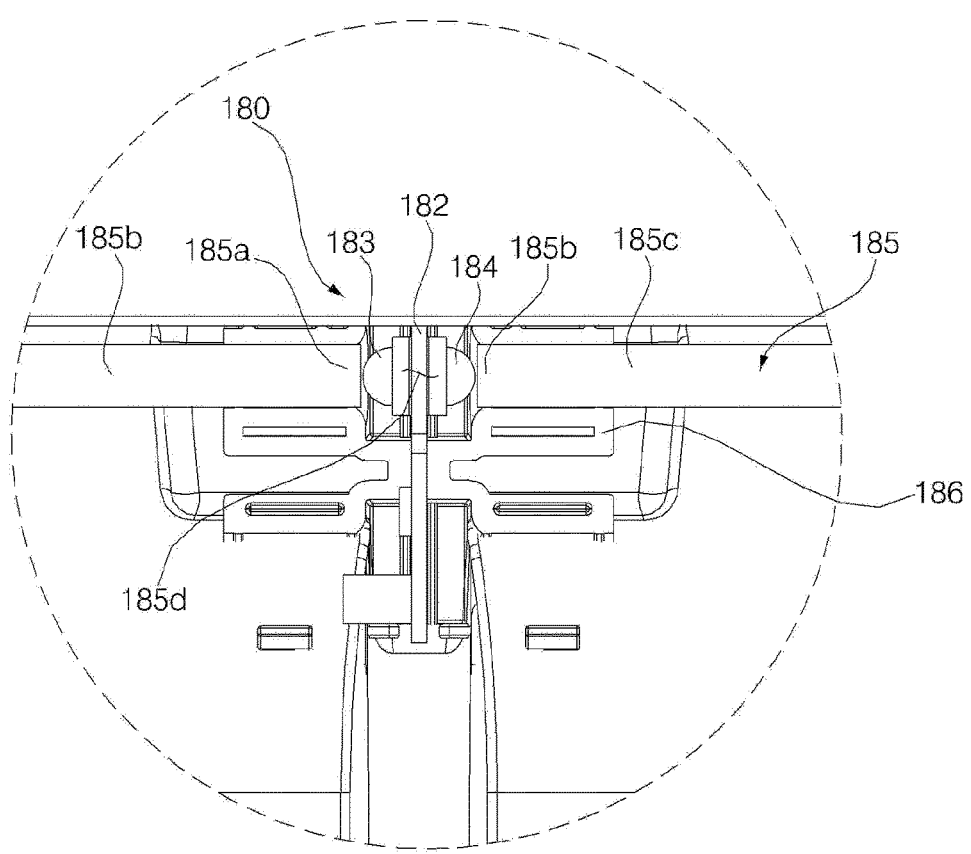
FIG. 17 is an enlarged view of A shown in FIG. 16.
Figure 18:
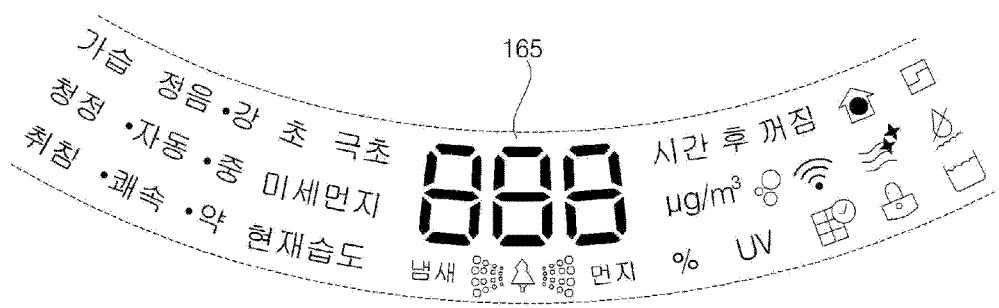
FIG. 18 is a plan view illustrating the display part shown in FIG. 12.

FIG. 6 is a perspective view of an upper body lower side of FIG. 2. FIG. 7 is a front view of FIG. 6. FIG. 8 is a cross-sectional view taken along a line A-A of FIG. 7. FIG. 9 is a bottom view of FIG. 6. FIG. 10 is a plan view of FIG. 6. FIG. 11 is a cross-sectional view taken along a line B-B of FIG. 10. FIG. 12 is an exploded perspective view of an upper body when seen from the rear side of FIG. 6. FIG. 13 is an enlarged view of B shown in FIG. 12. FIG. 14 is an exploded perspective view when seen from the bottom of FIG. 12. FIG. 15 is an enlarged view of C shown in FIG. 14. FIG. 16 is a front view of FIG. 12. FIG. 17 is an enlarged view of A shown in FIG. 16.

The upper body 120 may configured the upper part of the base body 110 and the water tank 300 may be mounted thereon. The water tank 300 may be inserted into the upper body 120.

The upper body 120 may support the load of the air wash module 100. Especially, the water tank 300 may be mounted on the upper body 120 and the water tank 300 and the upper body 120 may contact each other.

A vibration insulation member 370 may be disposed between the water tank 300 and the upper body 120. The vibration insulation member 370 may separate the water tank 300 and the upper body 120 by a predetermined interval, and vibration-isolate the water tank 300 and the upper body 120.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, an air guide 170 coupling the upper inner body 140 and the upper outer body 128 and guiding air to the water tank 300, and an outer visual body 214 coupled to the upper side of the upper outer body 128 and formed of a transparent material.

Since the upper body 120 is disposed to separate the connection flow passage and the water tank insertion space 125, water of the water tank 300 flowing into the connection flow passage can be minimized particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to a water tank inlet 31. The upper inlet 121 may not be an essential component. It may be sufficient if the upper body 120 has a shape that exposes the water tank inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of the upper inner body 140 360 degrees of a circumference of the upper inner body 140. The air guide 170 may guide air to the water tank 300 in all directions of 360 degrees of a circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing a connection angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the water tank inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The upper inner body 140 may have the inside in a concave form and surround the outside of the water tank 300. The vibration insulation member 370 may be disposed at the bottom 141 of the upper inner body 140.

The vibration insulation member 370 may protrude a predetermined height from the bottom 141 of the upper inner body 120. The vibration insulation member 370 may be formed of a different material than the upper inner body 140.

The upper inner body 140 may have an insertion groove 142 where the vibration insulation member 370 is inserted.

The insertion groove 142 may be disposed outside a first coupler 610. The insertion groove 142 may be disposed in plurality. The insertion groove 142 may be disposed in a circumferential direction on the basis of the watering motor shaft 43. The insertion groove 142 may be disposed symmetrically on the basis of the watering motor shaft 43. The insertion groove 142 may protrude downwardly from the bottom 141. The insertion groove 142 may be formed concave downwardly from the upper side.

Moreover, a fastening member 147 for fixedly fastening the upper body 120 and the lower body 130 may be disposed and the fastening member 147 may be installed at the insertion groove 142.

The lower end of the insertion groove 142 may be supported by a structure of the lower body 130. The fastening member may penetrate the lower end of the insertion groove 142 to be fastened to the lower body 130.

A hole 143 that the fastening member penetrates may be formed at the lower end of the insertion groove 142. After inserted into the insertion groove 142 at the upper side, the fastening member may be fastened to the lower body 130.

After the fastening member 147 is fastened, the vibration insulation member 370 may be insertingly installed to the insertion groove 142. The vibration insulation member 370 may seal the insertion groove 142. The exposure of the fastening member may be prevented by sealing the insertion groove 142 and the fastening member may be prevented from being exposed to water.

When the water of the water tank 300 overflows, the water may be stagnated at the bottom of the upper inner body 140, and when the fastening member 147 is exposed to the stagnated water, corrosion may occur.

Additionally, when water is stagnated in a water tank insertion space 125, water may be leaked into the lower body 130 through the hole 143 of the insertion groove 142. Since a plurality of electrical components are inside the lower body 130, flowing water may be prevented.

Sealing an installation structure of the fastening member 147 may be very important due to the above reason. In this embodiment, through the vibration insulation member 370, the air wash module 200 and the air clean module 100 may be vibration-insulated and also a coupling structure of the upper body 120 and the lower body 130 may be sealed.

A drainage part 149 for draining the water stagnated in the inside to the outside may be formed at the bottom 141 of the upper inner body 140. The drainage part 149 may protrude downwardly from the bottom 141 and a flow passage where water flows may be formed therein.

Reinforcing ribs like those formed at the bottom 301 of the water tank body 320 may be formed at the bottom 141 of the upper inner body 140. A reinforcing rib formed at the upper inner body 140 is identical to the above and thus, its description will be omitted.

An ultraviolet module 290 for providing ultraviolet rays may be installed at the bottom of the upper inner body 140. An upper opening part 146 may be formed at the bottom 141 of the upper inner body 140.

The upper opening part 146 may be formed open in a vertical direction. A window 147 of a material for transmitting ultraviolet rays may be disposed at the upper opening part 146.

The upper opening part 146 may be disposed at the lower side of the body opening part 326 and the base opening part 346 of the water tank 300. The ultraviolet module 190 may be disposed at the lower side of the window 147. The ultraviolet rays generated from the ultraviolet module 190 may penetrate the window 147 and the window module 390 to be projected into the water tank inside.

The watering motor 42 may be installed at the lower side of the upper inner body 140 and the watering motor shaft 43 may penetrate the bottom 141 of the upper inner body 140 to protrude upwardly. The first coupler 610 may be disposed at the upper end of the watering motor shaft 43. The first coupler 610 may be disposed inside the upper inner body 140 and protrude upwardly from the bottom 141.

The sensor housing 336 where the magnetic sensor 334 is installed may be disposed at a side part of the upper inner body 140. The sensor housing 336 may installed as closely contacting the outer side surface of the upper inner body 140. The sensor housing 336 may be formed extending long in a vertical direction in order to detect a water level of the water tank 300. A magnetic sensor 334 may be disposed inside the sensor housing 336. The sensor housing 336 may be located inside the air guide 170 and disposed at a clean connection flow passage 104.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may communicate with the inside of the water tank 300. In this embodiment, the humidification medium 50 may be disposed inside the clean connection flow passage 104.

A watering motor 42 of the watering unit 40 described later may be installed at the upper body 120. The watering motor 42 may be physically separated from the blower motor 22.

The watering motor 42 may be fixed at the outside of the upper inner body 140 through a watering bracket 126. In this embodiment, the watering motor 42 may be fixed at the undersurface of the upper inner body 140. In this embodiment, the driving force of the watering motor 42 may penetrate the upper inner body 140 to be delivered to the inside of the water tank 300.

In this embodiment, the watering motor 42 and the blower motor 22 may be separately installed to different structures and through this, vibration may be prevented. In this embodiment, the watering motor 42 may be installed at an upper body 120 and the blower motor 22 may be installed at a blower housing 150. Through this, when two motors 22 and 42 operate at the same time, resonance and vibration may be minimized. The blower motor 22 and the watering motor 42 may be controlled separately.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a base connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display module 160 may have a ring shape. Unlike this embodiment, the display module 160 may be formed into an arc shape. The display module 160 may include a display PCB 162 and a display housing 164. The display housing 164 may be formed of a material that reflects light and coated with a material that reflects light.

Accordingly, when water drops are formed on the visual body 210, water drops formed on the visual body 210 may be projected onto or reflected by the surface of the display housing 164. When the water drops formed on visual body 210 flows down, the same effect is also shown on the display housing 164.

This effect may give a visual stimulus to a user, and a user may intuitively recognize that humidification is being performed. The water drop image projected on the display housing 164 may give a refreshment feeling to a user, and may allow a user to know the humidification state.

The upper side surface of the display housing 164 may be obliquely formed. The display housing 164 may be obliquely disposed toward a user. Accordingly, the inside of the display 160 may be high, and the outside thereof may be low.

Moreover, a humidification and air cleaning apparatus according to this embodiment may include a dust sensor 181 and display the cleanness of indoor air based on data detected from the dust sensor 181.

The dust sensor 181 may measure a dust state by detecting a dust concentration in air. The dust sensor 181 may be disposed at the side outside of the base body 110. The dust sensor 181 may be disposed inside a filter assembly cover 11 and exposed to the outside through a detection opening part 12.

The dust sensor 181 may detect a dust concentration by each dust particle size and in this embodiment, distinguish and detect a dust concentration, for example, PM 1.0, PM 2.5, and PM 10.0.

A lighting module 180 for displaying the cleanness of indoor air as the color of a light source may be disposed at the upper body 120. The lighting module 180 may display the cleanness of indoor air through the color of a light source. For example, the lighting module 180 may classify a dust concentration in three steps and may emit light through red color, yellow color, and green color.

In this embodiment, the lighting module 180 may be formed in a ring shape and release the emitted light to the outside of the upper body 120. The lighting module 180 may be disposed at various positions. In this embodiment, the lighting module 180 may be disposed at a visual body and release the emitted light to the outside through the visual body.

It may be regardless that the lighting module 180 is installed at any one of the outer visual body 214 or the visual body 210. In this embodiment, the light emitting module 180 may release the emitted light to the outside through the outer visual body 214. The light emitted from the lighting module 180 may be spread to the entire outer visual body 214. The lighting module 180 may diffuse light through indirect lighting.

For this, an installation part 220 where the lighting module 180 is installed may be formed at the outer visual body 214. Unlike this embodiment, the installation part 220 may be disposed at the visual body 210.

In this embodiment, the lighting module 180 may be disposed at the lower side of the display module 160. The lighting module 180 may be disposed at the lower side of the base connector 260. The lighting module 180 may be disposed outside the air guide 170 and the lighting module 180 may be disposed inside the upper outer body 128.

The lighting module 180 may include a printed circuit board 182, a first light emitting member 183 disposed at one side surface of the printed circuit board 182, a second light emitting member 184 disposed at the other side surface of the printed circuit board 182, a diffusion member 185 having one end 185a facing the first light emitting member 183 and the other end 185b facing the second light emitting member 184, and a bracket 186 for fixing the diffusion member 185 to a structure.

A controller for providing power to and controlling the first light emitting member 183 and the second light emitting member 184 may be disposed at the printed circuit board 182.

The printed circuit board 182 may be disposed vertically, and the first light emitting member 183 and the second light emitting member 184 may be arranged horizontally.

An installation groove 171 where the printed circuit board 182 is installed may be formed at the air guide 170. The installation groove 171 may be formed vertically.

The printed circuit board 182 may be disposed at the lower side of the base connector 260. Power may be provided to the printed circuit board 182 through the power connected to the base connector 260. A power cable (not shown) for providing power to the base connector 260 may be installed at the installation groove 171.

In this embodiment, the first light emitting member 183 may be disposed to face the left side of the printed circuit board 182 and the second light emitting member 184 may be disposed to face the right side of the printed circuit board 182.

In this embodiment, the first light emitting member 183 and the second light emitting member 184 may be LEDs.

The first light emitting member 183 and the second light emitting member 184 may be disposed to face each other in the opposite direction.

The diffusion member 185 may be formed of a light-transmitting material. When seen from a plane, the diffusion member 185 may be formed in a ring shape and its portion may be cut and spaced. The first light emitting member 183 and the second light emitting member 184 may be disposed at the spaced portion.

The first light emitting member 183 may project a light source at one side end of the diffusion member 185 and the second light emitting member 184 may project a light source at the other side end of the diffusion member 185.

The light source projected from the first light emitting member 183 may be refracted along the diffusion member 185 and may light the entire diffusion member 185.

The light source projected from the second light emitting member 184 may also be refracted along the diffusion member 185 and may light the entire diffusion member 185.

In this embodiment, by installing two light emitting members, the brightness of the diffusion member 185 may be formed uniformly. When a light source is disposed at one side, the other side may be dark or a brightness difference may occur. Especially, as the first light emitting member 183 and the second light emitting member 184 generate different colors of light sources, the diffusion member 185 may mix the colors of the light sources.

The diffusion member 185 may include a curved part, a first straight line part 185b and a second straight line part 185c disposed at the end parts of the curved part 185a, and a separation part 185d disposed between the straight line parts 185b and 185c.

The diffusion member 185 may be assembled to the bracket 186 and the bracket 186 may be fixed to a structure. In this embodiment, the bracket 186 may be fixed to the outer visual body 214. Unlike this embodiment, the bracket 186 may be fixed to another structure. For example, the bracket 186 may be fixed to any one of the display module 160, the upper outer body 128, or the air guide 170.

The bracket 186 may include a bracket body 187, a substrate installation groove 186a formed at the bracket body 187 and including the printed circuit board 182 inserted and fixed thereto, a first installation groove 186b including the first straight line part 186b inserted and fixed thereto, and a second installation groove 186c including the second straight line part 186c inserted and fixed thereto.

The substrate installation groove 186a may be a groove formed in a vertical direction. The first installation groove 186b and the second installation groove 186c may be grooves formed in a horizontal direction. The substrate installation groove 186a, the first installation groove 186b, and the second installation groove 186c may be connected to each other.

A bracket body 187 may be disposed to allow the substrate installation groove 186a, the first installation groove 186b, and the second installation groove 186c to face the outside.

Moreover, an installation part 220 for the lighting module 180 may be formed at the outer visual body 214.

The installation part 220 may be disposed at the lower part of the outer visual body 214. The installation part 220 may include an electronic component installation part 222 and a diffusion member installation part 224.

The electronic component installation part 222 may protrude inwardly from the lower end of the outer visual body 214. The printed circuit board 182 and the bracket 186 may be disposed at the upper side of the electronic component installation part 222.

In order to obtain an installation space of electronic components, the electronic component installation part 222 may further protrude downwardly from the diffusion member installation part 224.

Then, in order to drain water downwardly, a drainage part 223 open downwardly may be formed at the electronic component installation part 222.

The diffusion member installation part 224 may protrude inwardly from the lower end of the outer visual body 214 and a groove 225 where the diffusion member 185 is inserted may be formed at the upper side surface. The groove 225 may be formed concave downwardly. The groove 225 may extend long along the diffusion member installation part 224. When seen from a plane, the groove 225 may be formed in a ring shape.

When seen from a plane, the diffusion member installation part 224 may be formed in a ring shape.

In order to drain water downwardly, a drainage part 227 open downwardly may be formed at the middle part of the diffusion member installation part 224.

Moreover, a humidification and air cleaning apparatus according to this embodiment may display information of the dust sensor 181 to the display module 160 separately from the lighting module 180.

The display module 160 may include a display part 163 for displaying a state of an air conditioner as an icon or a letter. The display part 163 may be disposed at a display housing 164. The display part 163 may display an air state, an operating mode, or other setting states as an icon, a letter, or a number. A number display part 165 for displaying numbers may be disposed at the display part 163.

Data detected from the dust sensor 181 may be displayed on the number display part 165 and a user may recognize the amount of dust through the displayed number.

In this embodiment, a controller (not shown) of a humidification and air cleaning apparatus according to this embodiment may process signals received from the dust sensor 181 and display the amount of dust as a number on the number display part 165.

Additionally, a controller (not shown) of a humidification and air cleaning apparatus according to this embodiment may process signals received from the dust sensor 181 and display the processed signals as the colors of light on the lighting module 180.

After seeing the color of light emitted from the lighting module 180, a user may intuitively know the cleanness of indoor air.

In order to check the amount of dust displayed on the number display part 165, after approaching a humidification and air cleaning apparatus, a user is required to check a number with an intention.

The color of light displayed on the lighting module 180 may be checked away from a humidification and air cleaning apparatus.

An operation of the lighting module 180 will be described in more detail as follows.

A signal detected from the dust sensor 181 may be delivered to a controller and the controller may determine the amount of dust by processing the signal delivered from the dust sensor 181.

The determined amount of dust may be displayed on the number display part 165 of the display module 160. Additionally, after dividing the determined amount of dust into a plurality of sections, the controller may control the lighting module 10 through a color corresponding to each section.

In order to output a color corresponding to the amount of dust, the controller may transmit a control signal to the printed circuit board 182 and the first light emitting member 183 and the second light emitting member 184 may output the light of a corresponding color.

The light emitted from the first light emitting member 183 may be incident to one end 185a of the diffusion member 185, and may be diffused along the inside of the diffusion member 185.

The light emitted from the second light emitting member 184 may be incident to the other end 185b of the diffusion member 185, and may be diffused along the inside of the diffusion member 185.

Since the first light emitting member 183 and the one end 185a are disposed to face each other, the light emitted from the first light emitting member 183 may be easily incident to the inside of the diffusion member 185.

Since the second light emitting member 184 and the other end 185b are disposed to face each other, the light emitted from the second light emitting member 184 may be easily incident to the inside of the diffusion member 185.

The incident light may be refracted inside the diffusion member 185 and may be diffused to the other opposite end. Since light is incident from each of the one end 185a and the other end 185b of the diffusion member 185, the entire brightness of the diffusion member 185 may be formed uniformly.

Moreover, since the diffusion member 185 is installed at the outer visual body 214, the light diffused to the outside of the diffusion member 185 may light the outer visual body 214.

Since the display module 160 is disposed at the upper side of the diffusion member 185, the light of the diffusion member 185 may be emitted to the outside through the installation part 220 installed at the lower side of the outer visual body 214.

Therefore, the lighting module 180 may emit light in a ring shape between the upper outer body 128 and the outer visual body 214.

The light generated from the lighting module 180 may be emitted to the outside in an indirect lighting form through the outer visual body 214. Thus, the light generated from the lighting module 180 may be checked in all directions of a humidification and air cleaning apparatus.

Then, since the light emitting position of the lighting module 180 is disposed at the lower side of the display module 160, it is located on one's eyes when a user sees the display module 160.

A user may intuitively check the cleanness of air through the color of light emitted from the lighting module 180.

In this embodiment, the first light emitting member 183 and the second light emitting member 184 may emit the same color of light. Unlike this embodiment, the first light emitting member 183 and the second light emitting member 184 may emit different colors of light.

For example, the first light emitting member 183 may emit green light and the second light emitting member 184 may emit yellow light. In this case, it may mean that a cleanness of indoor air is between each section.

Additionally, over time, the brightness of green light may be reduced and the brightness of yellow light may be increased. In this case, it may mean that a cleanness of indoor air becomes worse gradually. On the other hand, over time, the brightness of green light may be increased and the brightness of yellow light may be reduced. In this case, it may mean that a cleanness of indoor air becomes better gradually.

In such a way, the cleanness of air may be expressed variously through the color of light emitted from the lighting module 180.

A humidification and air cleaning apparatus according to an exemplary embodiment of the present invention has at least one of the following effects.

First, through the color of light emitted from a lighting module, the cleanness of indoor air can be recognized intuitively.

Second, since the light emitted from a lighting module means the cleanness of indoor air, the cleanness of indoor air can be checked at a long distance where a letter or a number is unidentifiable.

Third, since a diffusion member of a lighting module is formed in a ring shape and diffuses light in all directions, the cleanness of indoor air can be checked in all directions.

Fourth, since a first light emitting member and a second light emitting member allow light to be incident at the both ends of a diffusion member, the brightness of the diffusion member can be formed uniformly.

Fifth, since a lighting module is disposed at an installation part of an outer visual body, emitted light can be diffused through the outer visual body.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
   an air clean module to receive external air to filter the entered external air;
   an air wash module disposed on the air clean module to humidify the filtered air;
   a dust sensor disposed on at least one of the air clean module or the air wash module to detect a dust concentration of external air; and
   a lighting module disposed on at least one of the air clean module or the air wash module to emit light as a color classified according to a dust concentration detected by the dust sensor,
   wherein the lighting module comprises:
   a printed circuit board,
   a first light emitting member disposed at one side surface of the printed circuit board and a second light emitting member disposed at the other side surface of the printed circuit board, and
   a diffusion member having one end facing the first light emitting member and the other end facing the second light emitting member.

2. The humidification and air cleaning apparatus of claim 1, wherein the lighting module is disposed along an outer side surface of the air clean module or the air wash module, and emits light in all directions of a circumference of the air clean module or the air wash module.

3. The humidification and air cleaning apparatus of claim 1, wherein the diffusion member is formed in a ring shape.

4. The humidification and air cleaning apparatus of claim 1, wherein a portion of the diffusion member is cut off to form a separation part, and the first light emitting member and the second light emitting member are disposed at the separation part.

5. The humidification and air cleaning apparatus of claim 4, wherein the first light emitting member faces the one end of the diffusion member and emits light to the one end of the diffusion member to incident light to an inside of the diffusion member.

6. The humidification and air cleaning apparatus of claim 4, wherein the second light emitting member faces the other end of the diffusion member and emits light to the other end of the diffusion member to incident light to an inside of the diffusion member.

7. The humidification and air cleaning apparatus of claim 1, wherein the printed circuit board is disposed vertically and the first light emitting member and the second light emitting member are disposed horizontally.

8. The humidification and air cleaning apparatus of claim 1, wherein the first light emitting member and the second light emitting member are disposed in an opposite direction.

9. The humidification and air cleaning apparatus of claim 1, wherein the diffusion member further comprises a bracket fixed to the air clean module or the air wash module.

10. The humidification and air cleaning apparatus of claim 1, wherein the air wash module comprises:
    a visual body formed of a transparent material; and
    an installation part formed at the visual body,
    wherein the lighting module installed at the installation part, and light emitted from the lighting module is diffused to an outside through the visual body.

11. The humidification and air cleaning apparatus of claim 10, wherein the installation part comprises:
    a diffusion member installation part at which the diffusion member is disposed; and
    an electronic component installation part at which the first light emitting member, the second light emitting member, and the printed circuit board are disposed.

12. The humidification and air cleaning apparatus of claim 11, wherein the diffusion member installation part protrudes to the inside of the visual body, and the diffusion member is disposed at an upper side of the diffusion member installation part.

13. The humidification and air cleaning apparatus of claim 11, wherein the electronic component installation part protrudes to the inside of the visual body, and the printed circuit board, the first light emitting member, and the second light emitting member are disposed at an upper side of the electronic component installation part.

14. The humidification and air cleaning apparatus of claim 11, further comprising a drainage part disposed on at least one of the diffusion member installation part or the electronic component installation part to drain water.

* * * * *